(12) United States Patent
Hosokawa et al.

(10) Patent No.: US 8,195,325 B2
(45) Date of Patent: Jun. 5, 2012

(54) NUMERICAL CONTROLLER HAVING OSCILLATING OPERATION FUNCTION CAPABLE OF CHANGING SPEED IN OPTIONAL SECTION

(75) Inventors: Masahiko Hosokawa, Minamitsuru-gun (JP); Makoto Haga, Minamitsuru-gun (JP); Yousuke Koyanaka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/052,505

(22) Filed: Mar. 21, 2011

(65) Prior Publication Data
US 2011/0287693 A1 Nov. 24, 2011

(30) Foreign Application Priority Data
May 24, 2010 (JP) .................................. 2010-118738

(51) Int. Cl.
*G06F 19/00* (2011.01)
(52) U.S. Cl. ........................ 700/188; 700/173; 700/174
(58) Field of Classification Search .......... 700/173–178, 700/188
See application file for complete search history.

(56) References Cited

U.S. PATENT DOCUMENTS

| 4,653,360 | A | * | 3/1987 | Compton | 82/18 |
| 4,831,787 | A | * | 5/1989 | Grimm et al. | 451/25 |
| 6,015,515 | A | * | 1/2000 | Fujita | 264/40.1 |
| 2005/0215176 | A1 | | 9/2005 | Sakagami et al. | |

FOREIGN PATENT DOCUMENTS

| JP | 4-8473 | 1/1992 |
| JP | 8-243799 | 9/1996 |
| JP | 9-230920 | 9/1997 |
| JP | 11-65633 | 3/1999 |

\* cited by examiner

*Primary Examiner* — Sean Shechtman
(74) *Attorney, Agent, or Firm* — Drinker Biddle & Reath LLP

(57) ABSTRACT

A machine tool has an oscillating axis that reciprocates in an optional region. A numerical controller that controls the machine tool designates positions of a lower dead point and a upper dead point when the oscillating axis of the machine tool reciprocates, and a reference speed during the oscillating operation when the oscillating axis reciprocates. The numerical controller then calculates, from the current position of the oscillating axis, a current phase in the case where one stroke of the oscillating axis is defined as one cycle, and calculates the speed of the oscillating axis at the current phase based upon the calculated current phase and the reference speed.

4 Claims, 12 Drawing Sheets

NUMERICAL CONTROLLER HAVING OSCILLATING OPERATION FUNCTION CAPABLE OF CHANGING SPEED IN OPTIONAL SECTION

RELATED APPLICATION DATA

This application claims priority under 35 U.S.C. §119 and/or §365 to Japanese Application No. 2010-118738 filed May 24, 2010, the entire contents of which is incorporated herein by reference.

BACKGROUND OF THE INVENTION

1. Field of the Invention

The present invention relates to a numerical controller having a function of controlling an oscillating operation of a grinding tool on a grinding machine.

2. Description of the Related Art

A grinding machine that grinds a machine tool executes an oscillating operation for grinding a side face of a workpiece by moving a Z-axis in vertical direction as well as moving X-axis and Y-axis together with the movement of the Z-axis.

U.S. Patent Application Publication No. 2005/0215176 A1 describes a numerical controller that controls two or more control axes for performing a contouring control, the apparatus having chopping movement data generating means that simultaneously controls the two or more control axes so as to perform a chopping operation, and at the same time, generates movement data for performing the contouring control.

Japanese Patent Application Laid-Open No. 4-8473 describes that a numerical controller employing a chopping control system for controlling a chopping operation of a grinding tool includes chopping distance calculating means for calculating a chopping distance from designated a upper dead point and a lower dead point, a correction table that stores a chopping correction value corresponding to a chopping speed, and an adder that adds the chopping distance and the chopping correction value to calculate a chopping distance command value.

Japanese Patent Application Laid-Open No. 9-230920 describes that only a specific region is processed by changing a cut amount and a feed speed of a tool in the region set beforehand to an NC machine tool, in order to shorten a processing time in a cutting workpiece. Japanese Patent Application Laid-Open No. 11-65633 describes that a ratio of a feed speed to a revolution of a spindle is changed with respect to a set region. Japanese Patent Application Laid-Open No. 8-243799 describes a punch operation control apparatus that subdivides a path of a punch tool, and treats even the same position as a different position, whereby a speed can be changed for every section in a punch press machine.

The speed control in the oscillating operation described in the above-mentioned U.S. Patent Application Publication No. 2005/0215176 A1 and Japanese Patent Application Laid-Open No. 4-8473 outputs a moving amount with a designated constant speed. Therefore, an acceleration/deceleration process is needed at a turn-around of a boundary point. Accordingly, an accumulation in the moving amount is caused, which affects the precision of the boundary point.

Japanese Patent Application Laid-Open No. 4-8473 described above discloses a technique of correcting the accumulation in the moving amount due to the acceleration/deceleration process and a delay of a servo motor. Depending upon the designation of a speed and a time constant during the acceleration and deceleration, the accumulation in the moving amount during the acceleration and deceleration increases, and hence, the correction amount increases. Accordingly, it takes much time to complete the correction.

In the technique described in Japanese Patent Application Laid-Open No. 9-230920 and Japanese Patent Application Laid-Open No. 11-65633, the designated region is treated with a bit pattern. Therefore, the determination as to the difference in the moving direction is not made. In the oscillating operation, even the same position is needed to be treated as a different position, when the moving direction is different. Therefore, prior art described in Japanese Patent Application Laid-Open No. 9-230920 and Japanese Patent Application Laid-Open No. 11-65633 cannot be applied to the oscillating operation.

In the technique described in Japanese Patent Application Laid-Open No. 8-243799, the position of each section is changed depending upon a thickness of a workpiece. However, this technique originally aims a control of a punch operation, and a continuous control such as the oscillating operation is not supposed. Further, this technique does not assume the change in the path, so that it cannot be applied to the case where the oscillating region is shifted.

SUMMARY OF THE INVENTION

The present invention is accomplished in view of the problems of prior art described above, and aims to provide a numerical controller that controls a machine tool, the machine tool being capable of enhancing precision at a boundary point without producing an accumulation in a moving amount during acceleration and deceleration at a turn-around at the boundary point.

Another object of the present invention is to provide a numerical controller that controls a machine tool, the machine tool being capable of changing a speed in an optional section according to an oscillating control in order to reduce a grinding processing time in which the machine tool makes many strokes and shortening a processing cycle time.

A numerical controller that controls the machine tool having an oscillating axis reciprocating in an optional region includes a designating unit that designates positions of a lower dead point and a upper dead point when the oscillating axis reciprocates, and a reference speed in an oscillating operation when the oscillating axis reciprocates; a phase calculating unit that calculates, from the current position of the oscillating axis, a current phase in the case where one stroke of the oscillating axis is defined as one cycle; a speed calculating unit that calculates the speed of the oscillating axis in the current phase on the basis of the current phase calculated by the phase calculating unit and the reference speed; and a control unit that controls the oscillating axis based upon the speed calculated by the speed calculating unit.

The numerical controller described above further can include a speed changing unit that changes the speed of the oscillating axis in an optional section of the phase. The numerical controller described above further can include a determining unit that determines whether the speed difference, which is the difference between the speed of the oscillating axis in the section changed by the speed changing unit and the speed before the change, falls within a maximum acceleration or not; and a changing unit that changes a speed changing ratio, when the speed difference exceeds the maximum acceleration as a result of the determination by the determining unit.

The reference speed is the maximum speed during the movement of the oscillating axis from the lower dead point to the upper dead point.

The present invention can provide a numerical controller that controls a machine tool, the machine tool being capable of enhancing precision at a boundary point without producing an accumulation in a moving amount during acceleration and deceleration at a turn-around at the boundary point.

The present invention can also provide a numerical controller that controls a machine tool and that can change a speed in an optional section according to an oscillating control in order to reduce a grinding processing time in which the machine tool makes many strokes and can shorten a processing time.

BRIEF DESCRIPTION OF THE DRAWINGS

The above and other object and features of the present invention will be apparent from the ensuing description of the embodiments with reference to the accompanying drawings, in which.

DETAILED DESCRIPTION OF THE PREFERRED EMBODIMENTS

Figure 1:
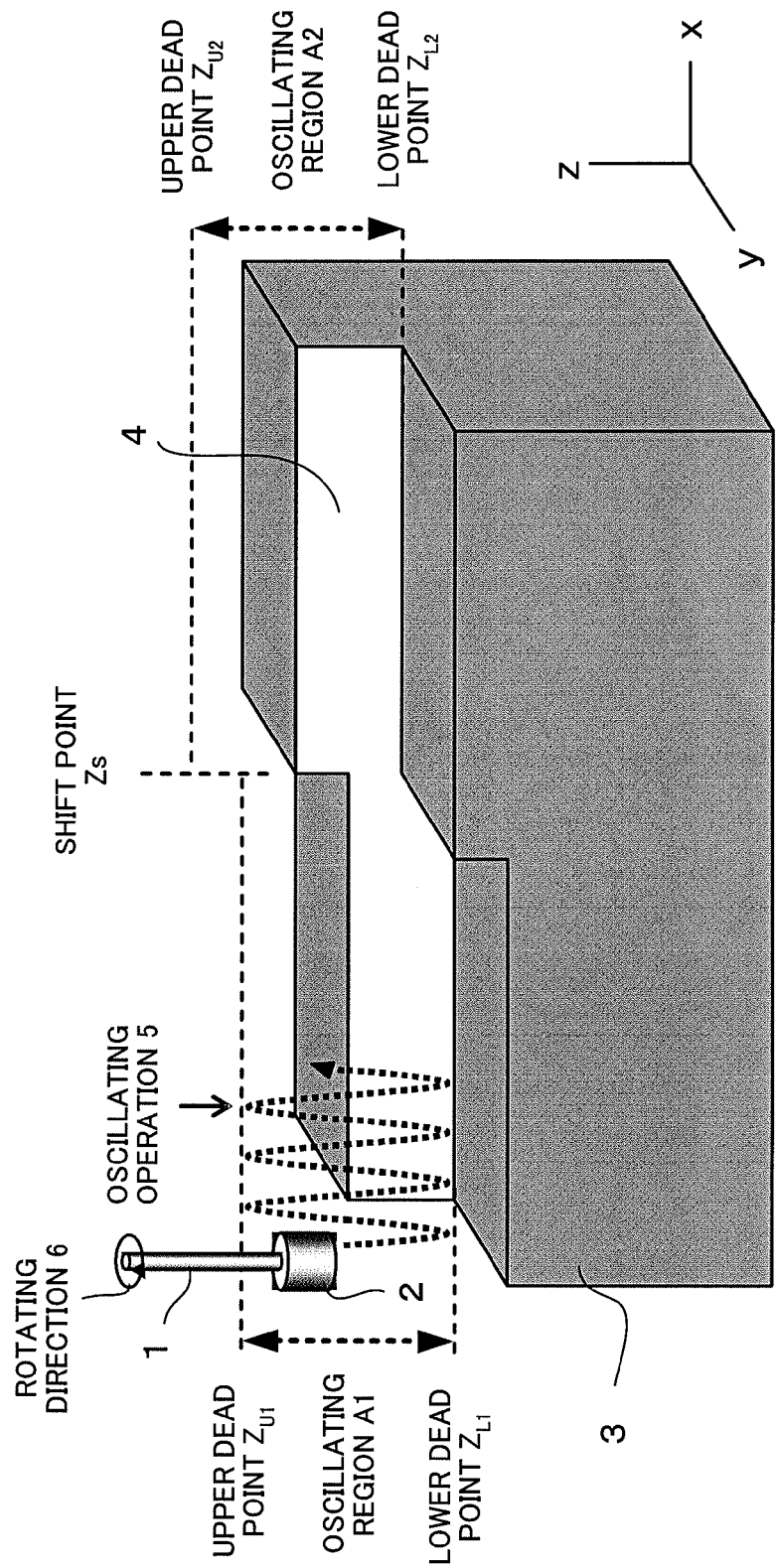
FIG. 1 is a view for describing an oscillating operation employed on a grinding machine.

FIG. 1 is a view for describing an oscillating operation employed on a grinding machine.

An oscillating axis 1, which is a grinding axis, reciprocates in a Z-axis direction so as to allow a grinding tool 2 to move up and down as illustrated in FIG. 1 as "oscillating operation 5". The grinding tool 2 rotates in a direction indicated as "rotating direction 6" in FIG. 1, and advances in an X-axis direction perpendicular to the Z-axis direction, thereby grinding a side face of a workpiece 3 that is indicated as "grinding surface 4". The grinding tool 2 is driven such that there is a period when the grinding tool 2 is separated from the workpiece 3 within one cycle of the oscillating operation.

A numerical controller having an oscillating operation function controls a machine tool such as a grinding machine, wherein it causes the machine tool to make a reciprocating movement in the Z-axis direction, and at the same time, causes the machine tool to move in the X-axis direction and Y-axis direction, which are orthogonal to the Z-axis, so as to perform an oscillating operation for grinding the side face of the workpiece 3. The movement in the Z-axis direction (in the vertical direction) is constant. The end point, which is a boundary point of the oscillating region in the upper direction is referred to as a upper dead point, while the end point that is a boundary point of the oscillating region in the lower direction is referred to as a lower dead point. In FIG. 1, the end point in the upper direction is represented as upper dead points $Z_{O1}$ and $Z_{O2}$, while the end point in the lower direction is represented as lower dead points $Z_{L1}$ and $Z_{L2}$. In FIG. 1, the oscillating region of the tool 2 is changed from an oscillating region A1 to an oscillating region A2 at a shift point Zs. The change of the oscillating region can be designated by a machining program as described later.

Figure 2:
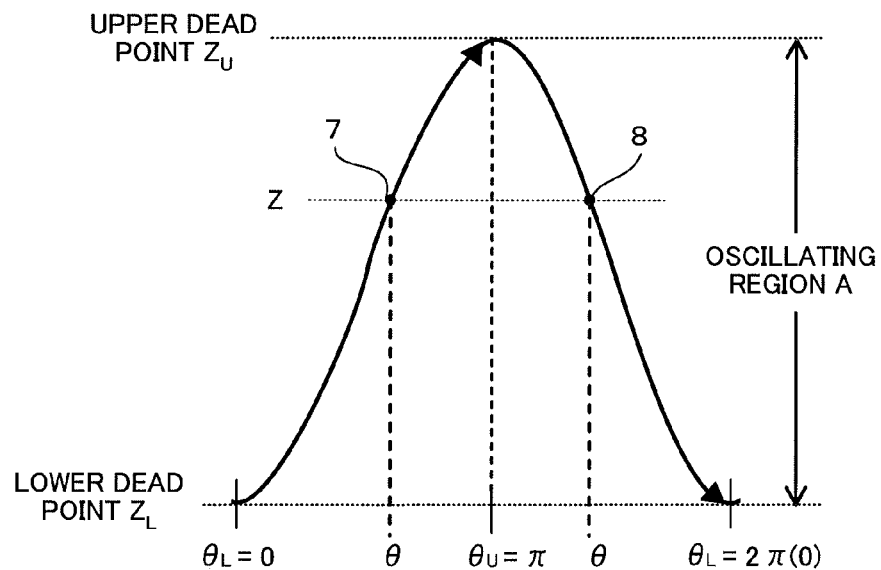
FIG. 2 is a view for describing an oscillating function that manages the position of an oscillating axis based upon phase information.

FIG. 2 is a view for describing the oscillating function that manages the position of the oscillating axis based upon phase information.

The region where the oscillating axis 1 (see FIG. 1) oscillates is represented as "oscillating region A", the end point that is the boundary point of the oscillating region in the lower direction of the oscillating operation is represented as the lower dead point $Z_L$, and the end point that is the boundary point of the oscillating region in the upper direction of the oscillating operation is represented as the upper dead point $Z_U$. The phase θL at the lower dead point $Z_L$ is defined as 0(2π) radian, while the phase $θ_u$ at the upper dead point $Z_U$ is defined as π radian. The waveform in FIG. 2 represents the oscillating operation of the oscillating axis 1 (tool 2) of one cycle.

As for the phase θ of the position Z in the oscillating operation, positions Z during the movement from the lower dead point $Z_L$ to the upper dead point $Z_U$ is 0<θ<π, and positions Z during the movement from the upper dead point $Z_U$ to the lower dead point $Z_L$ is π<θ<2π(0), whereby even the same position can be treated as different positions 7 and 8 depending upon the moving direction of the oscillating axis. The relationship between the position Z and the phase θ can be represented by an equation (1) or equation (2) described below.

$$Z = \frac{|Z_U - Z_L|}{2}(1 - \cos(\theta)) + Z_L \quad (1)$$

$$\theta = \arccos\left(1 - \frac{2(Z - Z_L)}{|Z_U - Z_L|}\right) \quad (2)$$

When the equation (1) is differentiated with respect to θ, an equation (3) described below is obtained.

$$\frac{\partial Z}{\partial \theta} = \frac{|Z_U - Z_L|}{2}\sin(\theta) \quad (3)$$

The relationship between the phase θ and the time t is represented by an equation (4) described below by using a later-described reference speed $F_B$.

$$\text{Angle: } \theta = \frac{F_B}{\frac{|Z_U - Z_L|}{2}} t \qquad (4)$$

Figure 3:
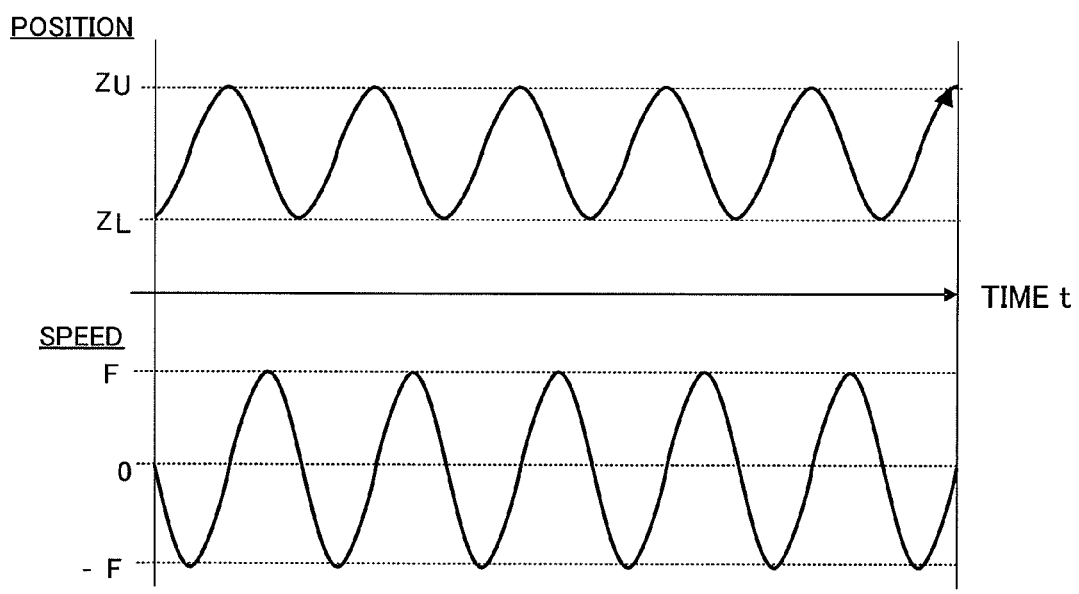
FIG. 3 is a view for describing that a speed control in which acceleration and deceleration is gently performed like a sine waveform is possible.

A rate equation based upon a sine wave as represented by an equation (5) described below can be derived from the equation (3) and the differential equation of the equation (4) with respect to the time t. When the reference speed $F_B$ that is the maximum speed during the oscillating operation is set beforehand, or an instruction is issued simultaneous with the oscillating operation, and the speed during the oscillating operation is calculated from the equation (5) described below, a speed control in which the speed is gently accelerated or decelerated as represented by the sine wave (see FIG. 3) can be realized.

$$\text{Rate equation: } \frac{\partial Z}{\partial t} = F_B \sin\left(\frac{2F_B}{|Z_U - Z_L|} t\right) \qquad (5)$$

The speed may be calculated by using equations (6) and (7) described below, instead of the equations (4) and (5), and by setting or giving an instruction of an angular speed ω instead of the reference speed $F_B$ during the oscillating operation.

$$\text{Angular speed: } \omega = \frac{2F_B}{|Z_U - Z_L|} \qquad (6)$$

$$\text{Rate equation: } \frac{\partial Z}{\partial t} = \frac{|Z_U - Z_L|}{2} \omega \sin(\omega t) \qquad (7)$$

The command of the oscillating operation instruction instructed in the machining program may be issued in a format described below.

G81.1 Z_ Q_ $F_B$_; Optional numerical values, respectively)
G01 X_ Y_ F_;
G80

In the machining program described above, "G81.1" means an oscillating operation starting command code, "Z" means the upper dead point ($Z_U$), "Q" means the oscillating distance (the distance from the upper dead point ($Z_U$) to the lower dead point ($Z_L$)), and "$F_B$" means the reference speed in the oscillating operation. "G80" means an oscillating operation stop command. "G01" means a linear interpolation command code, "X" means the moving amount on the X-axis, "Y" means the moving amount on the Y-axis, and "F" means a synthesis rate on the X-axis and the Y-axis.

Figure 4:
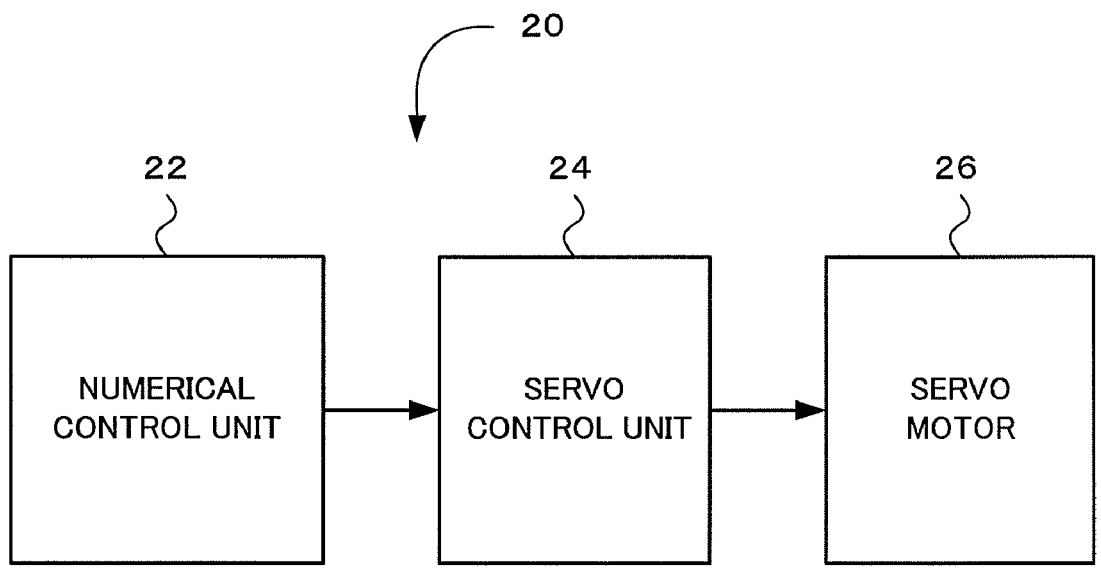
FIG. 4 is a block diagram illustrating a numerical controller that executes the oscillating operation according to the present invention.

FIG. 4 is a block diagram illustrating a numerical controller that executes the oscillating operation according to the present invention. The numerical controller reads, analyzes, and executes the above-mentioned machining program for every block. A numerical control unit 22 executes a process of flowcharts illustrated in FIGS. 7, 12A and 12B described below, so as to execute the oscillating control according to the present invention.

Figure 5:
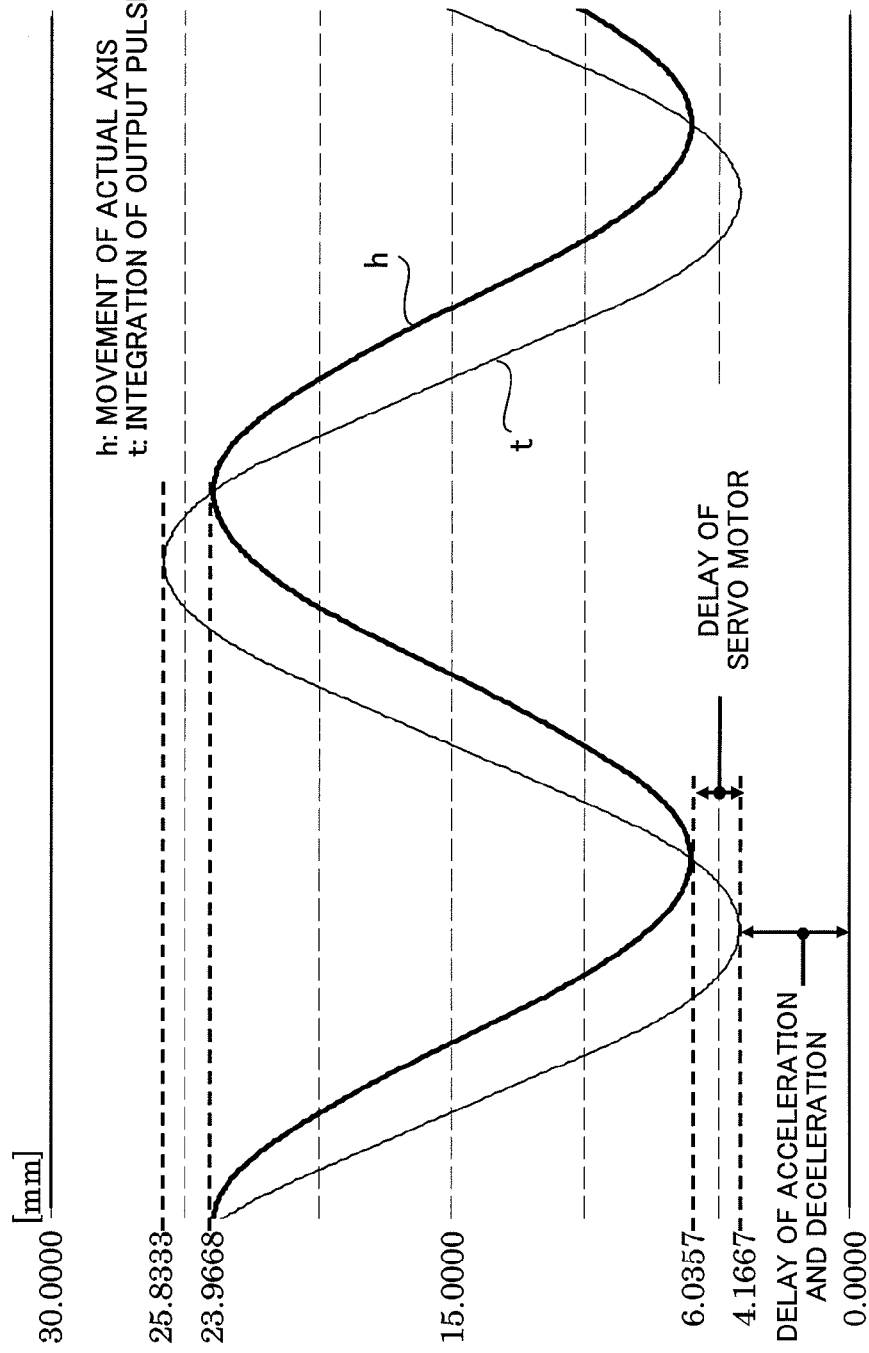
FIG. 5 is a view for describing a speed control according to prior art.
Figure 6:
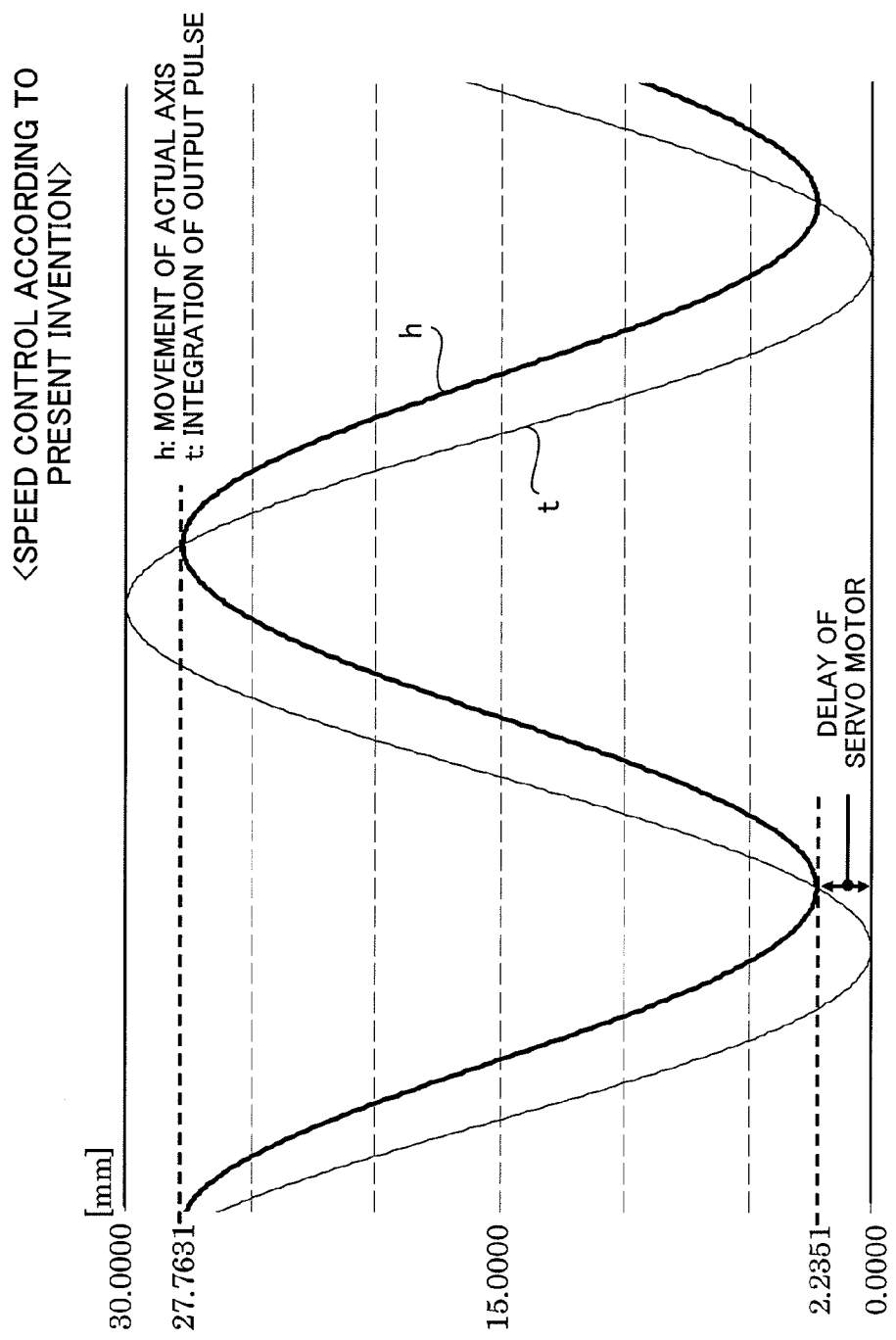
FIG. 6 is a view for describing the speed control according to the present invention.

Next, a speed control according to prior art and the speed control according to the present invention are compared with reference to FIGS. 5 and 6. In the description below, the oscillating operation is made without being corrected, wherein the oscillating section is 30.000 millimeters (upper dead point: 30.000 millimeters, lower dead point: 0.000 millimeter), and the oscillating operation takes 0.3 second for one stroke.

FIG. 5 is a view for describing a speed control according to prior art. In FIG. 5, a bold line h indicates the movement of the actual axis, and a thin line t indicates an integration of an output pulse output to a servo control unit from the numerical control unit (see FIG. 4) of the numerical controller. In the speed control according to prior art, an error of about 6.036 millimeters is caused because of the sum of the delay in the acceleration and deceleration (time constant of 0.09 second) and the delay of a servo motor as illustrated in FIG. 5.

On the other hand, FIG. 6 is a view for describing the speed control according to the present invention. In FIG. 6, a bold line h indicates the movement of the actual axis, and a thin line t indicates an integration of an output pulse output to a servo control unit from the numerical control unit (see FIG. 4) of the numerical controller. In the case of speed control according to the present invention, there is no delay in the acceleration and deceleration, but there is only a delay of the servo motor. Due to the delay of the servo motor, an error of about 2.235 millimeters is caused as illustrated in FIG. 6.

Therefore, as understood from the comparison between FIGS. 5 and 6, the error in the speed control according to the present invention is about ⅓ times the error in the speed control according to prior art.

When the error is small, the necessary correction amount is decreased, so that the reduction in the time required for the correction can be realized. The error in the speed control according to the present invention is caused only by the delay of the servo motor. Therefore, when the technique of a preceding feed-forward or learning function is combined, the error can be reduced without making a correction in prior art.

Figure 7:
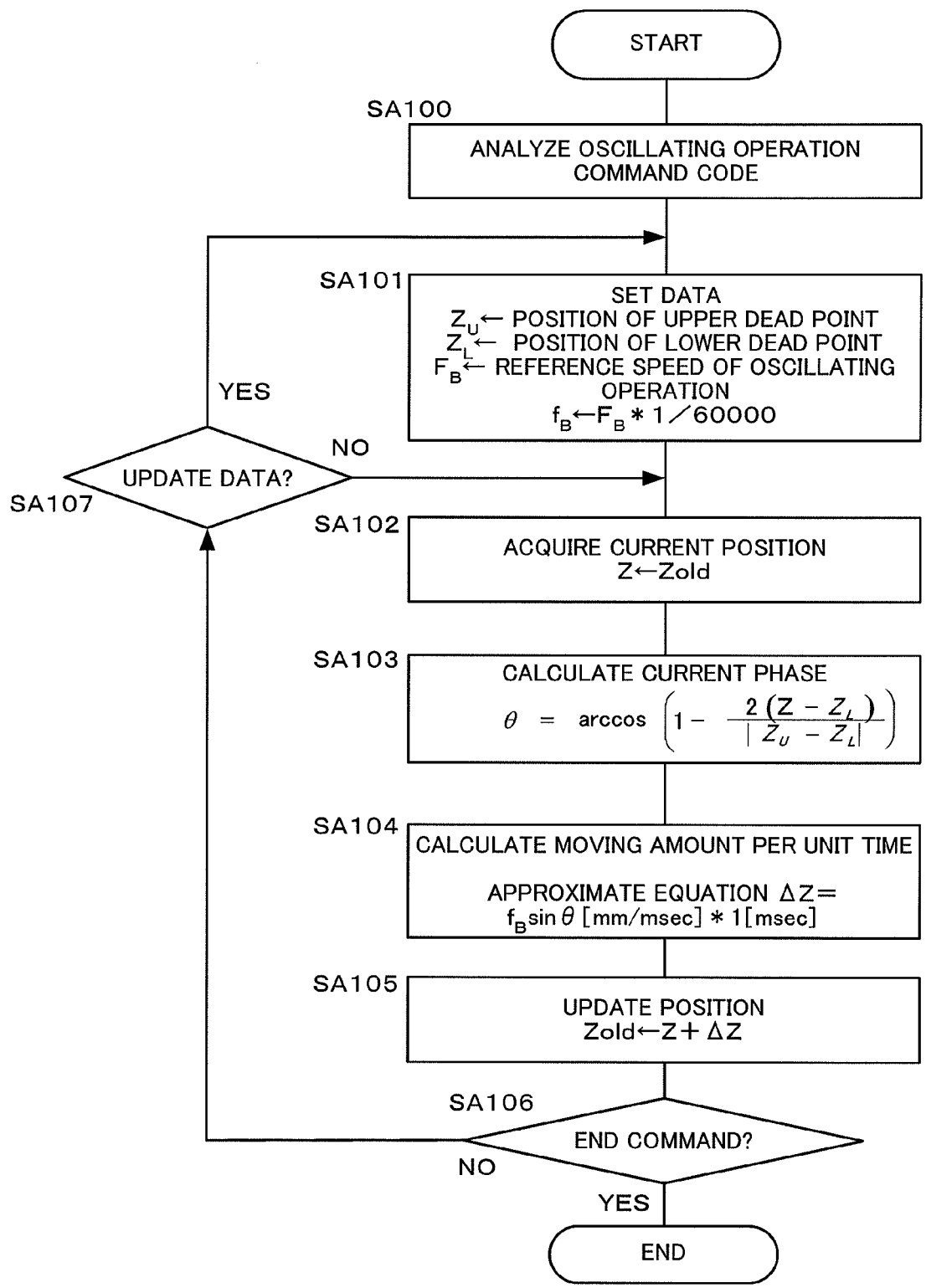
FIG. 7 is a flowchart illustrating an algorithm performing the oscillating operation in the speed control based upon the phase information according to the present invention.

FIG. 7 is a flowchart illustrating an algorithm performing the oscillating operation in the speed control based upon the phase information according to the present invention. It will be described in accordance with the respective steps. In the flowchart, a "unit time" is defined as 1 millisecond.

[Step SA100] Analyze the oscillating operation command code. The oscillating operation command code is written in the machining program that is read by the numerical controller.

[Step SA101] Set data. Specifically, the upper dead point position $Z_U$ millimeters, the lower dead point position $Z_L$ millimeters, and the reference speed $F_B$ millimeters/minute of the oscillating operation are respectively set. Since the "unit time" is defined as 1 millisecond, the reference speed $F_B$ having the unit of millimeter/minute is converted into the reference speed $F_B$ having the unit of millimeter/millisecond. The relationship between the reference speed $f_B$ and the reference speed $F_B$ set as described above is as follows.

$f_B = F_B \times 1/60000$ (millimeter/millisecond)

[Step SA102] Substitute a position $Z_{old}$ in the previous operation cycle into the position Z (current position) in the current operation cycle, in order to acquire the current position Z.

[Step SA103] Calculate the current phase θ from an equation (8) described below on the basis of the data $Z_U$ and $Z_L$ set in step SA101 and the current position Z acquired in the step SA102.

$$\theta = \arccos\left(1 - \frac{2(Z - Z_L)}{|Z_U - Z_L|}\right) \qquad (8)$$

[Step SA104] Calculate the moving amount ΔZ per unit time (1 millisecond) from the current phase θ, which is calculated in the step SA103, with the use of an approximate equation $\Delta Z = f_B \sin \theta$ millimeter/millisecond×1 millisecond.

[Step SA105] Add the moving amount $\Delta Z$ per unit time (1 millisecond), which is calculated in the step SA104, to the current position Z acquired in the step SA102, thereby obtaining $Z_{old}$. Specifically, the process of $Z_{old} \leftarrow Z + \Delta Z$ is performed.

[Step SA106] Determine whether an end command is issued or not, and when the end command is issued, end the process, while when the end command is not issued, proceed to step SA107.

[Step SA107] Determine whether the data set in the step SA101 is to be changed or not. When the data is to be changed, the program proceeds to the step SA101, and when the data is not to be changed, the program proceeds to the step SA102.

Figure 8:
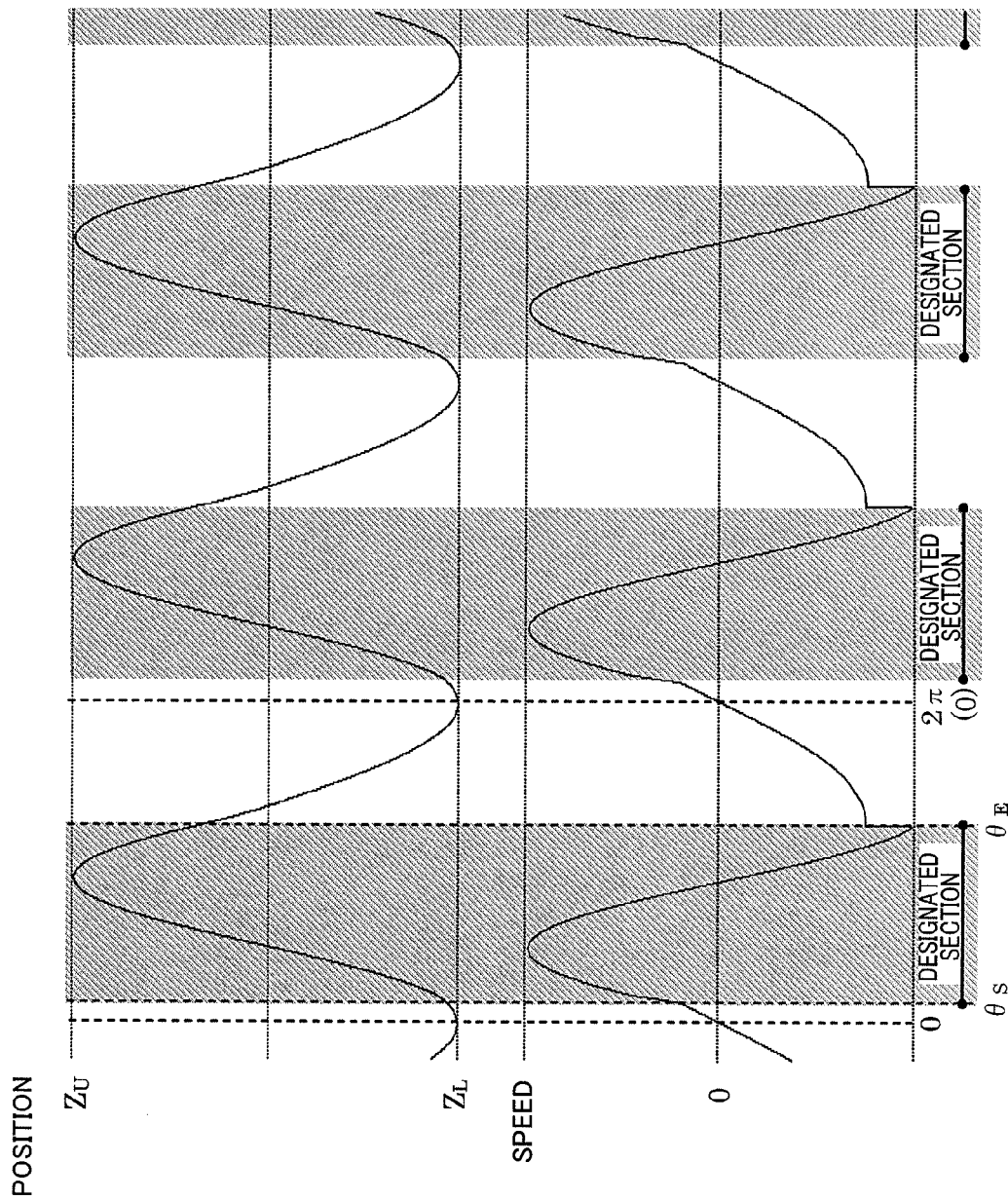
FIG. 8 is a view for describing that the speed in the section optionally designated by the phase information is changed.

FIG. 8 is a view for describing that the speed in the section optionally designated by the phase information is changed.

A start phase $\theta_S$ and an end phase $\theta_E$ of an optional section where the speed is changed, and the reference speed (angular speed) $F_B$ in the oscillating operation after the change are set beforehand, or they are instructed simultaneous with the oscillating operation. A set of optional sections and reference speeds (angular speeds) $F_B$ of the oscillating operation after the change may be present in plural numbers. The determination as to whether the oscillating axis is present in the designated section or not is always executed during the oscillating operation. When the oscillating axis is present in the designated section, the reference speed (angular speed) of the corresponding oscillating operation is changed. Since the reference speed (angular speed) of the oscillating operation is changed, the speed calculated in the same phase is changed.

Instead of changing the reference speed in the oscillating operation, a coefficient k (speed ratio) to be multiplied by the reference speed $F_B$ may be changed. Specifically, coefficient k may be changed as indicated in a rate equation (9) described below. The equation (9) corresponds to the one in which $k \times F_B \leftarrow F_B$ is established in the equation (5) and $k \times \omega \leftarrow \omega$ is established in the equation (7).

$$\text{Rate equation: } \frac{\partial Z}{\partial t} = kF_B \sin\left(\frac{2kF_B}{|Z_U - Z_L|} t\right) \text{ or} \quad (9)$$

$$\frac{\partial Z}{\partial t} = \frac{|Z_U - Z_L|}{2} k\omega \sin(k\omega t)$$

When the reference speed $F_B$ (angular speed $\omega$) or the speed ratio k is changed, a difference is caused between the actual current phase and the current phase determined by the time t. Therefore, the time t has to be changed when the reference speed (angular speed) or the speed ratio is changed. When the relationship between the current position Z and the angle $\theta$ in the equation (1) is used as represented by equations (10) and (11) described below, the speed can be obtained from the current position Z, not from the time (control cycle) t.

$$\text{Rate equation: } \frac{\partial Z}{\partial t} = kF_B \sin\theta \text{ or} \quad (10)$$

$$\frac{\partial Z}{\partial t} = \frac{|Z_U - Z_L|}{2} k\omega \sin(\theta + k\omega)$$

$$\theta = \arccos\left(\frac{2(Z - Z_L)}{|Z_U - Z_L|}\right) \quad (11)$$

Figure 9:
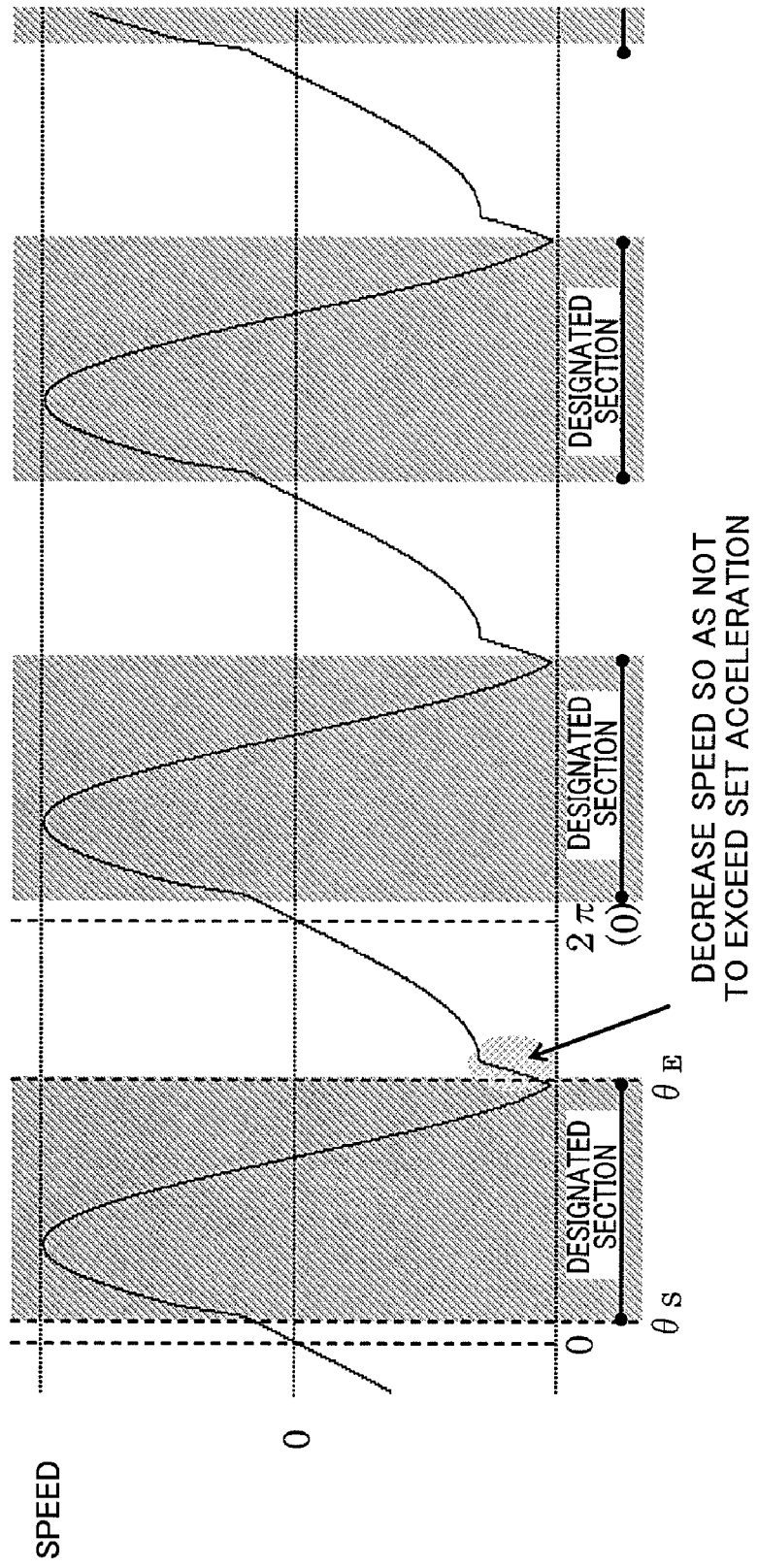
FIG. 9 is a view for describing that a shock can be reduced by keeping angular information even during the acceleration and deceleration, and by making it possible to perform a speed change where a speed does not exceed the maximum acceleration α.

On the other hand, when the reference speed or the speed ratio is simply changed, shock might be caused as illustrated in FIG. 8, if the speed difference is great. Therefore, the process for the acceleration and deceleration is needed. Since the current speed is calculated from the rate equation of the sine wave before and after the change in the reference speed or the speed ratio, the angle information has to be updated even during the acceleration and deceleration, while calculating the speed from the angle information. When the algorithm, which is used for changing the speed ratio as illustrated in equations (12) to (17) described below such that the speed is increased or decreased in order to prevent the acceleration from exceeding the maximum acceleration $\alpha$, is used, the speed change in which the acceleration does not exceed the maximum acceleration $\alpha$ can be executed, while maintaining the angle information. Therefore, the shock can be reduced as illustrated in FIG. 9.

(I) The sine wave speed $f_t$ (the moving amount of the oscillating axis per unit time (1 millisecond)) by the current speed ratio $k_t$ is represented by the equation (12) described below. In this equation, $f_B$ is the reference speed having a unit of millimeter/millisecond.

$$f_t = k_t f_B \sin \theta \quad (12)$$

(II) The sine wave speed $f_{new}$ by the speed ratio $k_{new}$ after the change is represented by the equation (13) described below.

$$f_{new} = k_{new} f_B \sin \theta \quad (13)$$

When absolute value of the speed difference $(f_{new} - f_t)$ of the oscillating axis based upon the change in the speed ratio from $k_t$ to $k_{new}$ is greater than the maximum acceleration $\alpha$, and the current phase is neither 0 (the position of the lower dead point) nor $\pi$ (the position of the upper dead point) (specifically, $|f_{new} - f_t| > \alpha$ as well as $\theta \neq 0$ and $\theta \neq \pi$, the speed $f_t$ (the sine wave speed) serving as the moving amount of the oscillating axis per unit time (1 millisecond) is changed in accordance with the maximum acceleration a with the use of the equation (14) described below.

$$f = f_t \pm \alpha = k_t f_B \sin \theta \pm \alpha \quad (14)$$

The next speed ratio $k_{t+1}$ is updated by the equation (15) described below.

$$k_{t+1} = k_t + \frac{\alpha}{f_B \sin\theta} \quad (15)$$

On the other hand, when the absolute value of the speed difference $(f_{new} - f_t)$ of the oscillating axis based upon the change in the speed ratio from $k_t$ to $k_{new}$ is not greater than the maximum acceleration $\alpha$, or the current phase is 0 (the position of the lower dead point) or $\pi$ (the position of the upper dead point) (specifically, if $|f_{new} - f_t| \leq \alpha$, $\theta = 0$, or $\theta = \pi$), then the current speed ratio $f_t$ is updated to the changed speed ratio $k_{new}$. The speed f this time is represented by the equation (16) described below.

$$f = f_{new} = k_{new} f_B \sin \theta \quad (16)$$

The next speed ratio $k_{t+1}$ is updated by the equation (17) described below.

$$k_{t+1} = k_{new} \quad (17)$$

Other than to treat the above-mentioned maximum acceleration $\alpha$ as a fixed value, the maximum acceleration a may be varied according to the time constant or the current speed difference, whereby the speed can more gently be increased and decreased.

FIG. 1 is a diagram illustrating an example of machining in which the oscillating axis moves in the X-axis direction, while making a reciprocating movement in the Z-axis direction. In the machining illustrated in FIG. 1, when the speed ratio in the section where the oscillating axis is not in contact with the grinding surface is increased, the cycle time can be reduced. In the example of machining shown in FIG. 1, it is supposed that, when the oscillating axis reaches the shift point $Z_s$, the shift command from the oscillating region A1 to the oscillating region A2 is issued.

Figure 10:
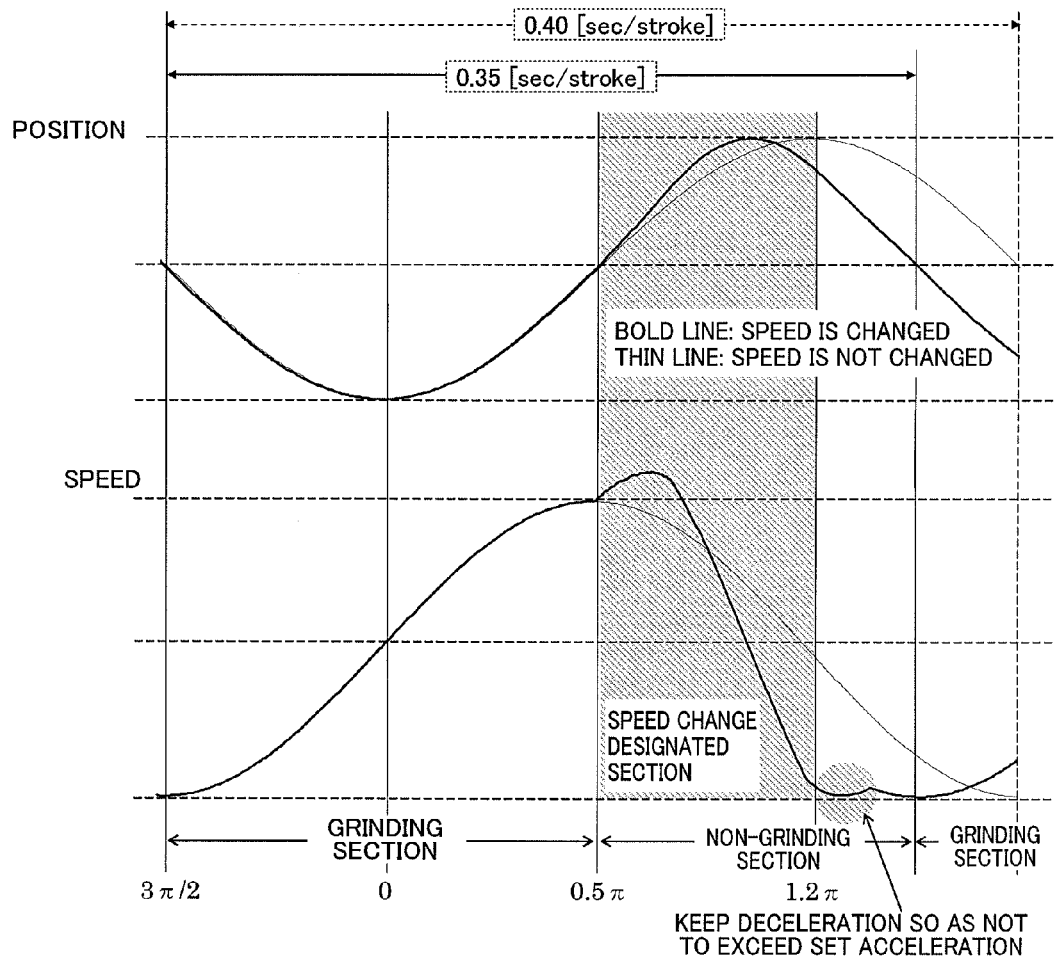
FIG. 10 is a view for describing that the cycle time is reduced when a speed ratio in the section where the grinding tool is not in contact with the cutting surface is increased.

FIG. 10 is a view for describing that the cycle time is reduced when the speed ratio in the section where the grinding tool is not in contact with the cutting surface is increased.

For example, when the length of the grinding surface in the X-axis direction is 60 millimeters, and the command is such that the oscillating axis moves in the X-axis direction by about 1.0 millimeter in one stroke of the oscillating operation, the oscillating operation of about 60 strokes is needed. When the speed change is not performed in the designated section, it takes about 24.0 seconds for 60 strokes, if the command for the oscillating operation in which it takes about 0.40 second for one stroke is issued. When the speed ratio in the designated section [0.5 π~1.2 π] is increased by a factor of 1.5, the time taken for one stroke becomes 0.35 second. In this case, it takes about 21.0 seconds for 60 strokes, which means the cycle time can be reduced by 3.0 seconds.

Figure 11:
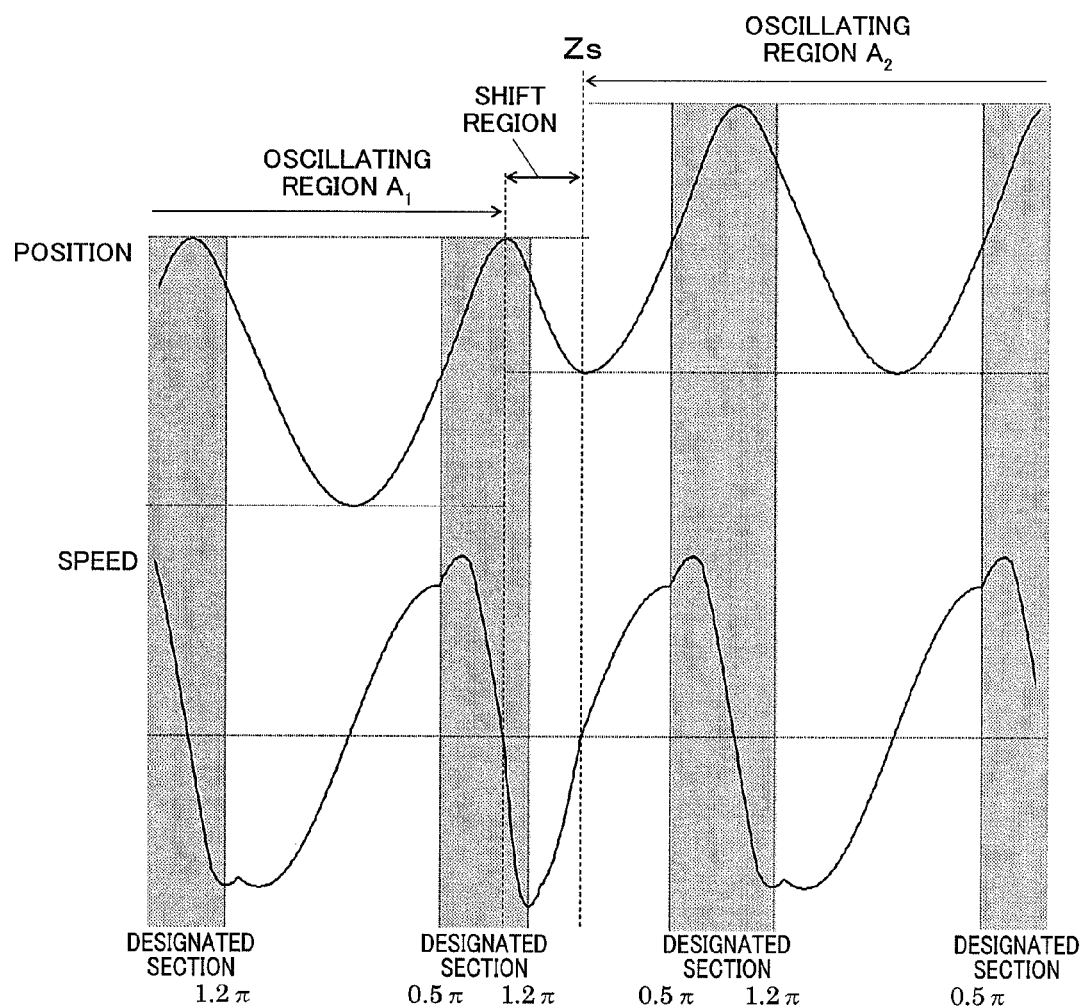
FIG. 11 is a view for describing that the speed change can be performed without changing the designated section even in case where the oscillating region is shifted.

FIG. 11 is a view for describing that the speed change can be performed without changing the designated section even in case where the oscillating region is shifted at the shift point $Z_3$.

Figure 12A:
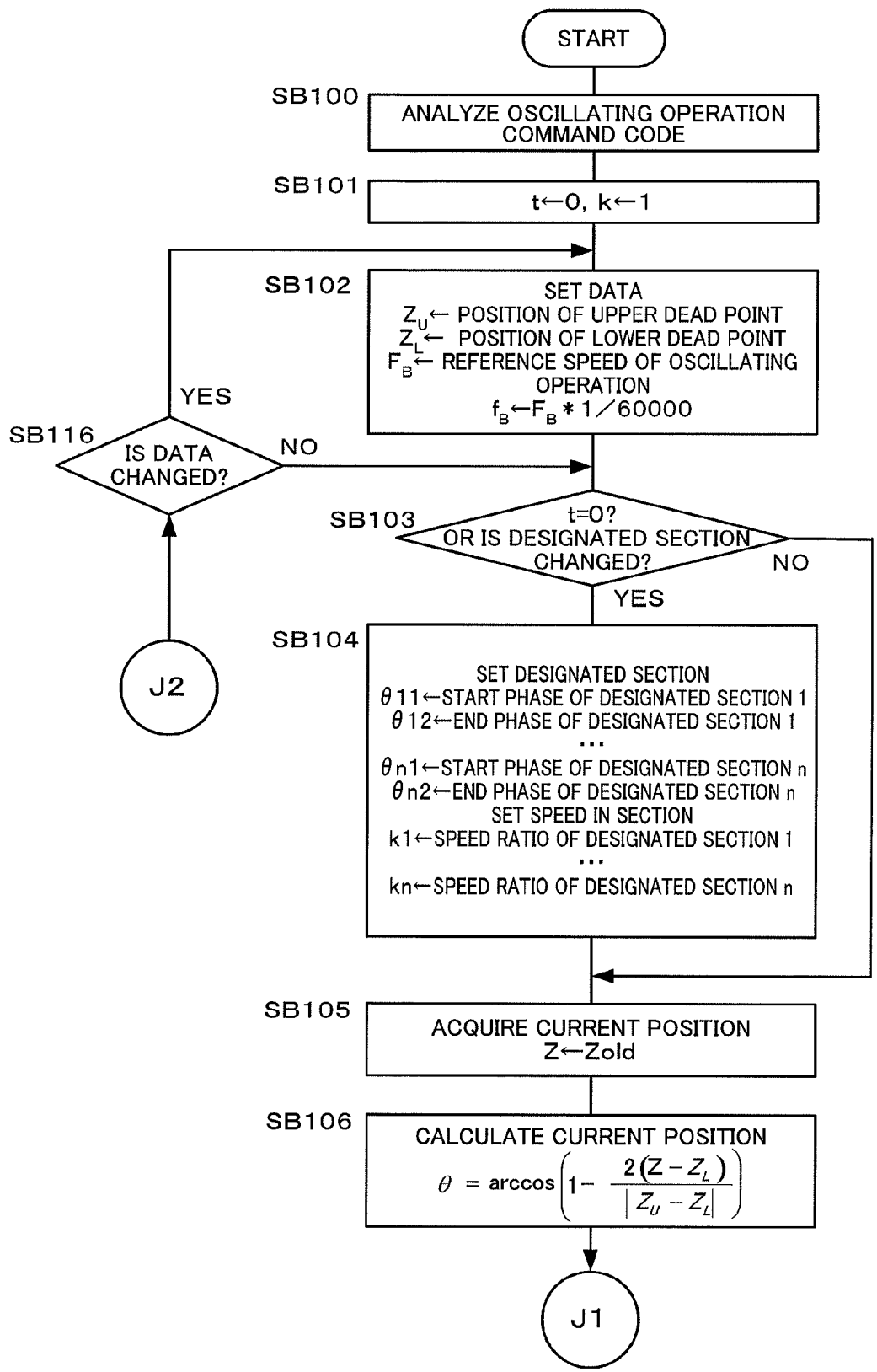
FIGS. 12A and 12B are flowcharts illustrating an algorithm of the oscillating operation in which the speed ratio can be changed in the section designated by the phase information.
Figure 12B:
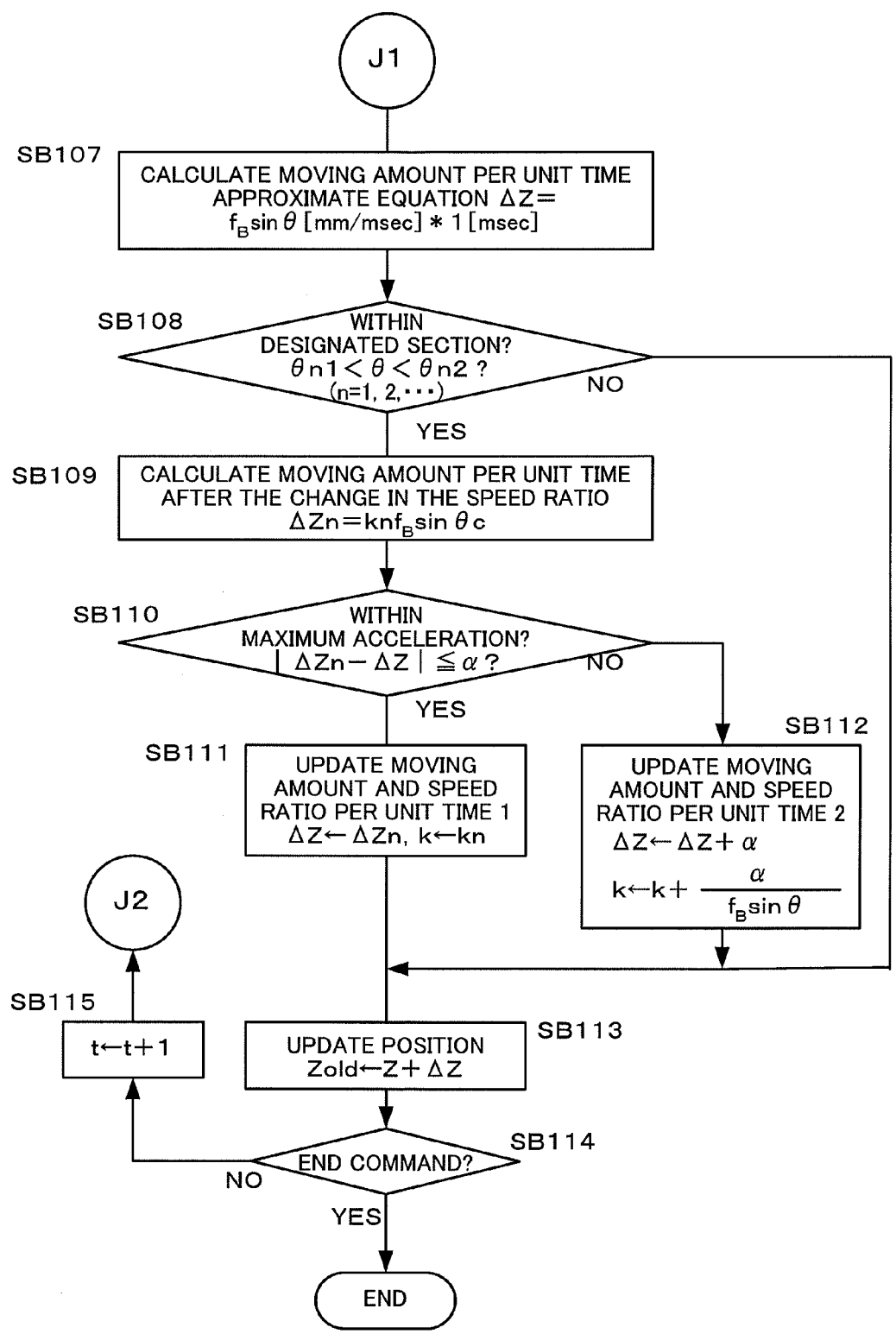

FIGS. 12A and 12B are flowcharts illustrating an algorithm of the oscillating operation in which the speed ratio can be changed in the section designated by the phase information. It will be described in accordance with the respective steps. In the flowchart, a "unit time" is defined as 1 millisecond.

[Step SB100] Analyze the oscillating operation command code. The oscillating operation command code is written in the machining program that is read by the numerical controller.

[Step SB101] Set 0 to t, and set 1 to k, where t means a time and k means the speed ratio.

[Step SB102] Set data. Specifically, the upper dead point position $Z_U$ millimeters, the lower dead point position $Z_L$ millimeters, and the reference speed $F_B$ millimeters/minute of the oscillating operation are respectively set. Further, the reference speed $f_B$ having a unit of millimeter/millisecond is obtained from the set reference speed $F_B$ (millimeter/minute) with the use of the equation of $f_B=F_B \times 1/60000$.

[Step SB103] Determine whether the equation of t=0 is established or not, or whether the designated section is to be changed or not. In either case, proceed to step SB104, and in neither case, proceed to step SB105.

[Step SB104] Set designated section (designated section 1, designated section 2, ... designated section n), and set speed or speed ratio in each section.

[Step SB105] Acquire the current position Z. Specifically, $Z_{old}$ is substituted into Z, where $Z_{old}$ means the position in the previous operation cycle and Z means the position in the current operation cycle.

[Step SB106] Calculate the current phase θ from the equation (8) described above.

[Step SB107] Calculate the moving amount ΔZ per unit time (1 millisecond) (=the speed of the oscillating axis in the present section before the speed change) with the use of an approximate equation $\Delta Z = f_B \sin\theta$ millimeter/millisecond×1 millisecond.

[Step SB108] Determine whether the current phase is within the designated section or not, and when it is within the designated section, proceed to step SB109. When it is not within the designated section, proceed to step SB113.

[Step SB109] Calculate the moving amount $\Delta Z_n$ per unit time (1 millisecond) after the change in the speed ratio (=the speed of the oscillating axis in the present section after the speed change).

[Step SB110] Determine whether the change in the moving amount $\Delta Z_n$ per unit time (1 millisecond) due to the change in the speed ratio (the absolute value of the difference between the moving amount ΔZ per unit time (1 millisecond) calculated in the step SB107 and the moving amount $\Delta Z_n$ per unit time (1 millisecond) calculated in the step SB109) is within the maximum acceleration α or not. When it is within the maximum acceleration α, proceed to step SB111, and when it is not within the maximum acceleration α, proceed to step SB112.

[Step SB111] Execute first update of the moving amount ΔZ per unit time (1 millisecond) and the speed ratio. Specifically, $\Delta Z_n$ is updated to ΔZ, and $k_n$ is updated to k.

[Step SB112] Execute second update of the moving amount ΔZ per unit time (1 millisecond) and the speed ratio k. Specifically, ΔZ and k are updated by the equation (18) described below. In the equation (18), the unit of α in the left side for updating ΔZ is treated as (millimeter/millisecond²)× $1^2$ (millisecond 2), and the unit of a in the right side for updating k is treated as (millimeter/millisecond²)×1 (millisecond), in order to unify units.

$$\Delta Z \leftarrow \Delta Z \pm \alpha, k \leftarrow k + \frac{\alpha}{f_B \sin\theta} \qquad (18)$$

[Step SB113] Update the position. Specifically, $Z_{old}$ is updated by Z+ΔZ.

[Step SB114] Determine whether an end command is issued or not. When the end command is issued, end the process. When the end command is not issued, proceed to step SB115.

[Step SB115] Set t+1 to t. Specifically, the time is put forward by 1 unit time (1 millisecond).

[Step SB116] Determine whether the data is to be changed or not. When the data is changed, proceed to step SB102. When the data is not to be changed, proceed to step SB103.

The invention claimed is:

1. A numerical controller that controls a machine tool having an oscillating axis that reciprocates in a region, comprising:
   a designating unit that designates positions of a lower dead point and a upper dead point when the oscillating axis reciprocates, and a reference speed that is a maximum speed in an oscillating operation when the oscillating axis reciprocates;
   a position detecting unit for detecting the current position of the oscillating axis that reciprocates between the lower dead point and the upper dead point;
   a phase calculating unit that calculates, from a current position of the oscillating axis detected by the position detecting unit, a current phase in which one stroke of the oscillating axis is defined as one cycle;

a speed calculating unit that calculates a speed of the oscillating axis in the current phase on the basis of the current phase calculated by the phase calculating unit and the reference speed; and a control unit that controls the oscillating axis based upon the speed calculated by the speed calculating unit.

2. The numerical controller that controls a machine tool having an oscillating axis according to claim 1, further comprising a speed changing unit that changes a speed of the oscillating axis in an optional section of the phase.

3. The numerical controller that controls a machine tool having an oscillating axis according to claim 2, further comprising: a determining unit that determines whether a speed difference, which is the difference between the speed of the oscillating axis in the section changed by the speed changing unit and the speed before the change, falls within a maximum acceleration or not; and a changing unit that changes a speed changing ratio, when the speed difference exceeds the maximum acceleration as a result of the determination by the determining unit.

4. The numerical controller that controls a machine tool having an oscillating axis according to claim 1, wherein the reference speed is the maximum speed during the movement of the oscillating axis from the lower dead point to the upper dead point.

* * * * *